(12) United States Patent
Billings et al.

(10) Patent No.: US 12,304,853 B2
(45) Date of Patent: May 20, 2025

(54) REFLECTOR FOR CURING OPTICAL FIBERS AND METHODS OF USING THE SAME

(71) Applicant: CORNING INCORPORATED, Corning, NY (US)

(72) Inventors: Kenneth Duane Billings, Wilmington, NC (US); Hector Michael Belleza De Pedro, Painted Post, NY (US); Robert Clark Moore, Wilmington, NC (US); Zachary Joseph Quist, Wilmington, NC (US); Michael James Todt, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 805 days.

(21) Appl. No.: 17/406,523

(22) Filed: Aug. 19, 2021

(65) Prior Publication Data

US 2022/0089480 A1    Mar. 24, 2022

Related U.S. Application Data

(60) Provisional application No. 63/080,073, filed on Sep. 18, 2020.

(30) Foreign Application Priority Data

Oct. 21, 2020 (NL) ..................................... 2026720

(51) Int. Cl.
*C03C 25/12* (2006.01)
*C03C 25/104* (2018.01)
*B05D 3/06* (2006.01)

(52) U.S. Cl.
CPC ............ *C03C 25/12* (2013.01); *C03C 25/104* (2013.01); *B05D 3/067* (2013.01)

(58) Field of Classification Search
CPC ........ C03C 25/104; C03C 25/12; B05D 3/067
See application file for complete search history.

(56) References Cited

U.S. PATENT DOCUMENTS 6,463,872 B1    10/2002  Thompson
8,251,526 B2     8/2012  Leonhardt
(Continued)

OTHER PUBLICATIONS

Netherlands Patent Application No. 2026720, Search Report dated Jun. 10, 2021; 12 pages; Netherlands Patent Office.

*Primary Examiner* — Yewebdar T Tadesse
*Assistant Examiner* — Stephen A Kitt
(74) *Attorney, Agent, or Firm* — Amy T. Lang

(57) ABSTRACT

An apparatus for curing a coating composition disposed on a glass optical fiber. The apparatus includes a reflector, the reflector having an interior surface delineating a boundary of a cavity, the interior surface including a plurality of portions, each of the portions extending along a different curved contour. Furthermore, each of the plurality of portions is configured to reflect curing light so that the reflected curing light is concentrated to a curing zone within the cavity such that all the reflected curing light within the curing zone has an intensity of about 60% or greater relative to a maximum intensity of the reflected curing light. A fiber location for the glass optical fiber is located within the curing zone. Additionally, the plurality of portions includes at least a first portion and a second portion, the first portion having a different degree of curvature than the second portion.

21 Claims, 8 Drawing Sheets

(56) References Cited

U.S. PATENT DOCUMENTS

| | | |
|---|---|---|
| 8,871,311 B2 | 10/2014 | Gharbi et al. |
| 9,067,241 B2 | 6/2015 | Hartsuiker et al. |
| 10,328,457 B2 | 6/2019 | Childers |
| 2015/0028020 A1* | 1/2015 | Childers ................ B05D 3/067 219/553 |
| 2015/0108370 A1 | 4/2015 | Gunter et al. |
| 2020/0192024 A1 | 6/2020 | Logunov |

* cited by examiner

REFLECTOR FOR CURING OPTICAL FIBERS AND METHODS OF USING THE SAME

This application claims the benefit of priority to Dutch Patent Application No. 2026720 filed on Oct. 21, 2020, which claims priority from U.S. Provisional Patent Application Ser. No. 63/080,073 filed on Sep. 18, 2020, the content of which is relied upon and incorporated herein by reference in its entirety.

BACKGROUND

Field

The present specification generally relates to reflector apparatuses and, in particular, to reflector apparatuses for curing glass optical fiber coatings and methods of using the same.

Technical Background

Polymer coatings are applied to glass optical fibers as the glass optical fibers are drawn. On early draw towers, curing of the polymer coatings was achieved by heating a liquid coating composition disposed on the surface of a glass optical fiber. For example, intense ultraviolet light sources have been used to cure the coating compositions to form polymer coatings on glass optical fibers. Until recently, these light sources were often mercury-plasma lamps, excited by microwave energy. Such lamps may be large, consume large amounts of energy, and require flows of cooling air to facilitate operation

SUMMARY

A first aspect of the present disclosure includes an apparatus for curing a coating composition disposed on a glass optical fiber. The apparatus comprises a reflector having a longitudinal length and defining a cavity, the reflector comprising an interior surface delineating a boundary of the cavity, the interior surface comprising a plurality of portions, each of the portions extending along a different curved contour. Furthermore, each of the plurality of portions is configured to reflect curing light so that the reflected curing light is concentrated to a curing zone within the cavity such that all the reflected curing light within the curing zone has an intensity of about 60% or greater relative to a maximum intensity of the reflected curing light. A fiber location for the glass optical fiber is located within the curing zone. Additionally, the plurality of portions comprises at least a first portion and a second portion, the first portion having a different degree of curvature than the second portion.

A second aspect of the present disclosure includes an apparatus for curing a coating composition disposed on a glass optical fiber. The apparatus comprises a reflector having a longitudinal length and defining a cavity. The reflector comprises an interior surface delineating a boundary of the cavity, the interior surface comprising a first portion extending along a first curved contour, the first curved contour forming a first circle comprising a first radius and a first center disposed at a first center location within the cavity, a second portion extending along a second curved contour, the second curved contour forming a second circle comprising a second radius and a second center disposed at a second center location within the cavity, a third portion extending along a third curved contour, the third curved contour forming a third circle comprising a third radius and a third center disposed at a third center location within the cavity. Additionally, a fiber location for the glass optical fiber is displaced from the first, second, and third center locations.

A third aspect of the present disclosure includes a method of curing a coating composition on a glass optical fiber. The method comprises directing a glass optical fiber through an opening into a cavity of a reflector, the glass optical fiber having a coating composition disposed thereon, the cavity being defined by an interior surface of the reflector, the interior surface comprising a plurality of portions, each of the portions extending along a different curved contour. The method further comprises directing curing light from a radiation source to a curing zone within the cavity so that the curing light reflects from the plurality of portions and is concentrated to the curing zone such that all the reflected curing light within the curing zone has an intensity of about 60% or greater relative to a maximum intensity of the reflected curing light, the glass optical fiber being disposed in the curing zone. The plurality of portions comprises at least a first portion and a second portion, the first portion having a different degree of curvature than the second portion.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
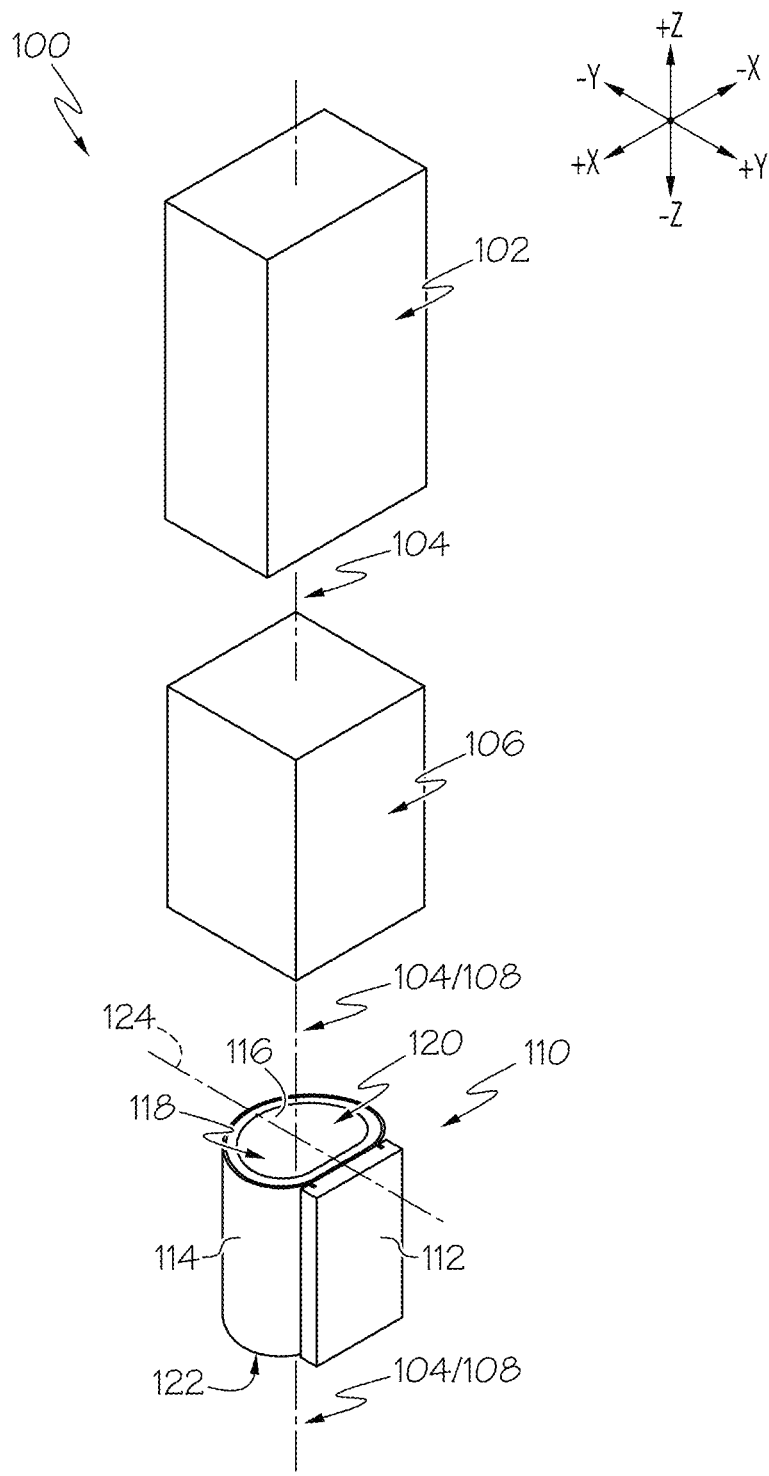
FIG. 1 schematically depicts an optical fiber forming apparatus including a curing apparatus for curing a coating, according to one or more embodiments described herein.

Reference will now be made in detail to embodiments of curing apparatuses comprising non-imaging reflectors used to cure coating compositions applied to glass optical fibers. Whenever possible, the same reference numerals will be used throughout the drawings to refer to the same or like parts. The non-imaging reflectors described herein may include a plurality of portions having differing degrees of curvature to reflect curing light from a radiation source to a glass optical fiber position. The radiation source may be an ultraviolet radiation-emitting array of light emitting diodes (LEDs) array comprising a plurality of LEDs emitting light along an illumination axis. The non-imaging reflectors described herein may provide improved concentration of curing light from the LED array over existing reflector apparatuses and may also provide a uniform energy distribution around a circumference of the glass optical fiber. Such improvements may facilitate increased draw speeds in fiber production and more efficient, uniform curing over existing reflector apparatuses. Various embodiments of non-imaging reflectors and methods of using the same will be described herein with specific reference to the appended drawings.

In this specification and in the claims which follow, reference will be made to a number of terms which shall be defined to have the following meanings:

"Include," "includes," "including", or like terms means encompassing but not limited to, that is, inclusive and not exclusive.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

"Optical fiber" refers to a waveguide having a glass portion surrounded by a coating. The glass portion includes a core and a cladding, and is referred to herein as a "glass optical fiber".

"Ultraviolet" or "UV" refers to wavelengths in the range from greater than or equal to 200 nm and less than or equal to 450 nm.

As used herein, "disposed on" means in contact with, where contact refers to direct contact or indirect contact. For example, a primary coating may be disposed on a glass optical fiber and is in direct contact with the glass optical fiber. A secondary coating is disposed on a glass optical fiber, disposed on a primary coating, in indirect contact with a glass optical fiber, and in direct contact with a primary coating. A tertiary coating is disposed on a glass optical fiber, disposed on a primary coating, disposed on a secondary coating, in indirect contact with a glass optical fiber, in indirect contact with a primary coating, and in direct contact with a secondary coating.

As used herein, the term "curable coating composition" refers to coating compositions that include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition or as a coating. The cured product may be a polymer. The curing process is induced by energy. Forms of energy include radiation or thermal energy. In embodiments, curing occurs with radiation, where radiation refers to electromagnetic radiation. Curing induced by radiation is referred to herein as radiation curing. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum.

A curable component includes one or more curable functional groups. Preferred curable functional groups include ethylenically unsaturated groups such as acrylate and methacrylate groups. Curable components include curable monomers and curable oligomers. In addition to curable monomers and/or curable oligomers, curable coating compositions typically include a photoinitiator and an additive. Additives include an adhesion promoter, a strength additive, an antioxidant, a catalyst, a stabilizer, an optical brightener, a property-enhancing additive, an amine synergist, a wax, a lubricant, and/or a slip agent. Secondary and/or tertiary coating compositions may also include a pigment.

As used herein, the term "non-imaging reflector" is used to refer to a reflector that does not reproduce a radiation source as an image, but rather concentrates radiation from the radiation source to achieve a flux density through a volume.

As used herein, the terms "degree of curvature" and "radius of curvature" of a surface refers to a radius of a curvature of a circular arc that approximates a cross-section of the surface. In cases where the surface comprises a circular cross section, the radius of curvature may be a constant that corresponds to the radius of curvature of the entire surface within the cross-section. In cases where the surface comprises a non-circular (e.g., elliptical) cross section, the radius of curvature may correspond to a calculated radius of curvature for a portion of the surface using a circular arc that approximates the surface.

As noted herein, mercury-plasma lamps, excited by microwave energy, have been used to cure coatings applied to glass optical fibers. However, ultraviolet light-emitting diodes are gaining favor. The light-emitting diodes ("LEDs") offer compactness and lower energy consumption, both directly through reduction of drive power and indirectly through reducing or eliminating the need for flows of cooling air required for mercury-plasma lamps.

While LEDs offer an improvement over mercury-plasma lamps, LEDs may create challenges in uniformly illuminating glass optical fibers because LED arrays may emit radiation that is not axially symmetric. LED arrays are by nature two-dimensional, meaning that at least some of the LEDs on the LED array are not positioned at a focal point of a conventional reflector. As a result, it is difficult to properly position a glass optical fiber at a point of maximum energy density because such a point may be displaced from a focal point of a conventional reflector. Additionally, conventional reflectors may suffer from abnormalities in azimuthal energy distribution with respect to the focal point, leading to non-uniform curing. Such defects in conventional reflectors may slow down processing times.

Embodiments disclosed herein are related to non-imaging reflectors, and methods of using non-imaging reflectors to cure coatings applied to glass optical fibers, which address at least some of the above-referenced problems with conventional reflectors Referring now to FIG. 1, a fiber forming apparatus 100 is schematically depicted. The fiber forming apparatus 100 includes a furnace 102, a coating apparatus 106, and a curing apparatus 110. The furnace 102 may be used to draw the glass optical fiber 104. In embodiments, the furnace 102 comprises a draw furnace that receives and heats an optical fiber preform and further includes mechanisms (tensioners, capstans, and the like) for drawing glass optical fiber from the heated optical fiber preform to a desired size and shape. For example, in a continuous optical fiber manufacturing process, a glass optical fiber 104 is drawn from a heated preform and sized to a target diameter (typically 125 μm) by the furnace 102. In embodiments, the glass optical fiber 104 is drawn through the fiber forming apparatus (e.g., by one or more capstans, not depicted) at a draw speed. In embodiments, the draw speed is greater than or equal to 25 m/s. In embodiments, the draw speed is greater than or equal to 35 m/s to facilitate relatively low fiber production times.

In embodiments, after the glass optical fiber 104 is drawn from the preform, the glass optical fiber 104 is cooled and directed to the coating apparatus 106. The coating apparatus 106 applies a coating composition 108 to the glass optical fiber 104. In some embodiments, the coating apparatus 106 is separate from the furnace 102. In other embodiments, the coating apparatus 106 is part of the furnace 102. In the embodiment depicted in FIG. 1, the glass optical fiber 104 is delivered to the coating apparatus 106 directly from the furnace 102 in a continuous fashion. In embodiments, the glass optical fiber 104 is delivered to the coating apparatus 106 from a source other than a draw tower or draw furnace, such as from a spool, in a continuous fashion (e.g. offline coating). A suitable curable coating composition 108 is a polymer or acrylate-based composition (e.g., containing an acrylate compound) which is curable by exposure to UV light. This material can be applied to the surface of the glass optical fiber 104 in a liquid state and subsequently exposed to UV light for curing in the curing apparatus 110. The curable coating composition 108 may be applied in one or more layers, such as a two-layer coating system. A primary coating may be applied directly to the surface of the glass optical fiber 104, and a secondary coating may be applied over the primary coating as an example.

In embodiments, the curable coating composition 108 includes a photoinitiator that creates a reactive species when exposed to radiation to initiate curing the curable coating composition 108. In embodiments, the photoinitiator is Diphenyl(2,4,6-trimethylbenzoyl)phosphine oxide (TPO). In embodiments, the curable coating composition 108 is disposed as a layer on the glass optical fiber 104. In embodiments, the layer has a thickness that is greater than or equal to 1 μm and less than or equal to 60 μm (e.g., greater than or equal to 5 μm and less than or equal to 55 μm, greater than or equal to 10 μm and less than or equal to 50 μm).

In embodiments employing secondary coatings, two process options are viable after application of the liquid primary coating composition to the glass optical fiber 104. In one process option (wet-on-dry process), the liquid primary coating composition is cured (e.g., via the curing apparatus 110) to form a solidified primary coating, and then the liquid secondary coating composition is applied to the cured primary coating (e.g., via a separate coating apparatus, not depicted), and the liquid secondary coating composition is cured (e.g., via an additional curing apparatus similar to the curing apparatus 110 described herein or an additional pass through the curing apparatus 110) to form a solidified secondary coating. In a second process option (wet-on-wet process), the liquid secondary coating composition is applied to the liquid primary coating composition, and both liquid coating compositions are cured simultaneously in a single curing step within the curing apparatus 110 to provide solidified primary and secondary coatings. After the glass optical fiber 104 exits the curing apparatus 110, the glass optical fiber 104 is collected and stored. Collection of the fiber typically entails winding the fiber on a spool and storing the spool.

In embodiments, a tertiary coating composition may be applied to the secondary coating and the tertiary coating composition may be cured to form a solidified tertiary coating. In embodiments, the tertiary coating is an ink layer used to mark the fiber for identification purposes and has a composition that includes a pigment and is otherwise similar to the secondary coating. The tertiary coating is applied to the secondary coating and cured. In embodiments, the fiber forming apparatus 100 includes a tertiary coating apparatus (not depicted) disposed downstream of the curing apparatus 110. In embodiments, the primary, secondary, and tertiary coating compositions can be applied and cured in a common continuous manufacturing process. In embodiments, the primary and secondary coating compositions are applied and cured in a common continuous manufacturing process, the coated fiber is collected, and the tertiary coating composition is applied and cured in a separate offline process to form the tertiary coating.

Referring still to FIG. 1, the curing apparatus 110 cures the curable coating composition 108 coated on the glass optical fiber 104 by supplying thermal energy thereto to initiate a curing reaction. The curing apparatus 110 comprises a radiation source 112 and a non-imaging reflector 114. In the depicted embodiment, the non-imaging reflector 114 is integrated with the radiation source 112. In embodiments, the non-imaging reflector 114 is not in direct contact with the radiation source 112, but rather held in spaced relation to the radiation source 112 (e.g., via support arms, not depicted, extending from an external surface of the non-imaging reflector 114 or a support structure). The non-imaging reflector 114 includes an interior surface 116 that delineates a boundary of a cavity 118 positioned to receive the glass optical fiber 104 from the coating apparatus 106. In embodiments, the interior surface 116 defines a cross-sectional shape that is open or closed. For example, in embodiments, the interior surface 116 defines an open cross-sectional shape to provide an opening for insertion of the radiation source 112. In embodiments, the interior surface 116 defines a closed cross-sectional shape (e.g., in at least some axial portions of the non-imaging reflector 114). In such embodiments, the non-imaging reflector 114 includes a discrete opening to allow curing light emitted by the radiation source to enter the cavity 118.

The non-imaging reflector 114 is depicted as including openings 120 and 122 at ends thereof to allow for entry and exit of the glass optical fiber 104 therefrom. The openings 120 and 122 are depicted to have cross-sectional areas (e.g., in the X-Y plane) that correspond to that of the cavity 118. In embodiments, the curing apparatus includes caps (not depicted) that cover portions of the openings 120 and 122 to prevent curing light emitted by the radiation source 112 from leaving the cavity 118. The caps may include sub-openings having smaller cross-sectional areas than the cavity 118 to allow for entry and exit of the glass optical fiber 104 from the curing apparatus 110. In embodiments, the caps may include inner reflective surfaces that face the cavity 118 to re-direct curing light towards the glass optical fiber 104. It should be noted that while the curing apparatus 110 is depicted to include a single non-imaging reflector 114, the curing apparatus 110 may include multiple non-imaging reflectors that are placed end-to-end to form the cavity 118. Further, in embodiments, the radiation source 112 may include multiple radiation sources (e.g., multiple LED arrays may be used and placed side-by-side).

In some embodiments, the cavity 118 comprises a consistent cross-sectional shape throughout an entirety of the curing apparatus 110 (e.g., the cavity 118 may comprise the same cross-sectional area along an entirety of the length of the non-imaging reflector 114 in the Z-direction). In embodiments, the length of the cavity 118 in the Z-direction corresponds to a length of the radiation source 112. The radiation source 112 may be constructed of a plurality of LED units stacked onto one another. In embodiments, each LED unit is 1 mm long in the Z-direction, and the radiation source 112 comprises a plurality of such LED units such that the radiation source 112 has a length that is greater than or equal to 1 cm in the Z-direction and less than or equal to 30 cm in the Z-direction. Accordingly, in embodiments, the length of the cavity 118 in the Z-direction may be greater than or equal to 1 cm and less than or equal to 30 cm. While FIG. 1 depicts a single non-imaging reflector 114 and radiation source 112, embodiments may include a plurality of non-imaging reflector 114/radiation source 112 combinations (e.g., one, two, three, four, five, six, seven, eight, nine, ten, and so on) stacked in the Z-direction such that the curing apparatus 110 has an overall length in the Z-direction that is greater than or equal to 50 cm, or greater than or equal to 75 cm, or greater than or equal to 100 cm, or greater than or equal to 125 cm, or greater than or equal to 150 cm. In embodiments, the curing apparatus 110 comprises a length greater than or equal to 50 cm and less than or equal to 300 cm. In embodiments, the curing apparatus 110 comprises a length greater than or equal to 75 cm and less than or equal to 225 cm. In embodiments, the curing apparatus 110 comprises a length greater than or equal to 100 cm and less than or equal to 200 cm. In embodiments, the length and cross-sectional area of the cavity 118 of the non-imaging reflector 114 may be selected based on a combination of factors, including, but not limited to the size (e.g., diameter) of the glass optical fiber 104, the curable coating composition 108, and properties of the radiation source 112 (e.g., output power, output spectral range, spatial energy distribution of the radiation source 112, and the like).

The radiation source 112 is a light source configured to emit curing light in a spectral band of interest that is absorbed by a component (e.g., the photoinitiator) of the curable coating composition 108 to induce curing thereof. In the depicted embodiment, the radiation source 112 is disposed outside of the cavity 118 and is external to the non-imaging reflector 114. The spectral band of interest of the radiation source 112 may depend on the components of the curable coating composition 108. In an example where the curable coating composition includes TPO as a photoinitiator, the radiation source 112 may emit curing light within a spectral band that contains a peak absorption wavelength (e.g., greater than or equal to 345 nm and less than or equal to 410 nm, or approximately 395 nm) of the photoinitiator. In embodiments, the radiation source 112 emits curing light that at least partially overlaps a portion of the absorption spectrum of a photoinitiator. In embodiments, the curable coating composition 108 includes a component that absorbs UV radiation. Accordingly, the radiation source 112 emits curing light within the UV spectrum (e.g., greater than or equal to 200 nm and less than or equal to 450 nm). In embodiments, the radiation source 112 comprises a plurality of LEDs. In embodiments, the LEDs are flat emitters that are bundled into an array to provide a light source with sufficient power to cure. In embodiments, the arrays are flat and are formed as part of a wafer.

In the embodiment depicted in FIG. 1, the radiation source 112 comprises a plurality of LEDs disposed on a planar-shaped wafer in a grid arrangement. The radiation source 112 comprises an emitter window (not depicted) such that curing light generated by the plurality of LEDs is emitted into a cavity 118 defined by an interior surface 116 of the non-imaging reflector 114. A plurality of different LED arrays having different sizes, LEDs, and configurations may be used, depending on the implementation. In embodiments, the emitter window of the radiation source 112 has a first dimension (e.g., length) in the draw direction (e.g., the Z-direction) of greater than or equal to 10 mm (e.g., 100 mm, 150 mm, 225 mm, 300 mm, 350 mm) and a second dimension (e.g., width) in a second direction perpendicular to the draw direction (e.g., the X-direction) that is smaller than the first dimension (e.g., 20 mm). Each LED of the radiation source 112 may emit curing light. In embodiments, each LED of the radiation source 112 emits curing light within the same spectral band of interest (e.g., that overlaps the absorbance spectrum of the curable coating composition 108). In embodiments, subsets of the LEDs of the radiation source 112 emits curing light covering different spectral ranges (e.g., portions of the spectral range of interest).

The rate at which the curable coating composition 108 cures within the non-imaging reflector 114 depends on the radiation flux that is incident on the glass optical fiber 104 while the glass optical fiber 104 is disposed in the non-imaging reflector 114. That is, to maintain relatively high draw speeds of greater than or equal to 20 m/s (e.g., greater than or equal to 35 m/s), the curing light from the radiation source 112 is concentrated such that the entirety of a circumference of the glass optical fiber 104 is exposed to sufficient energy density to cure the curable coating composition 108 by the time each axial position of the glass optical fiber 104 travels through the non-imaging reflector 114 at the draw speed.

In embodiments, the radiation source 112 has an irradiance of greater than or equal to 10 W/cm² at wavelengths absorbed by the curable coating composition 108. For example, in embodiments, the curable coating composition 108 comprises a TPO photoinitiator, which absorbs relative strongly in the wavelength range of greater than or equal 345 nm and less than or equal to 410 nm (with an absorbance peak at approximately 385 nm). In such embodiments, the plurality of LEDs of the radiation source 112 may have an irradiance of greater than or equal to 12 W/cm² within this wavelength range. For example, the radiation source 112 may have an irradiance of 16 W/cm² or 20 W/cm² at 385 nm. In embodiments, the radiation source 112 may have an irradiance greater than or equal to 4 W/cm² and less than or equal to 50 W/cm² throughout the wavelength range.

To improve the efficiency of curing, the curing light emitted by the radiation source 112 may be concentrated to increase the energy incident to the curable coating composition 108 disposed on the glass optical fiber 104. Conventional approaches for concentrating the curing light include using imaging optics where the glass optical fiber 104 is positioned at a focal point of imaging optics (e.g., imaging reflectors). Drawbacks to such imaging optics-based approaches include poor coupling efficiency and high sensitivity with respect to positioning of the glass optical fiber 104 relative to the imaging optics. The positioning of the glass optical fiber 104 relative to the imaging optics is rendered even more difficult if LED arrays are used for the radiation source 112 because LED arrays are not point sources, rendering it difficult to focus the curing light emitted thereby to a single location. In some examples employing imaging optics, LED brightness approaching 200 W/cm² is required to produce less than 30 W/cm² at the curable coating composition 108 disposed on the glass optical fiber 104. Such inefficiency may render various radiation sources incompatible with desired draw speeds for the glass optical fiber 104. Moreover, even if the glass optical fiber 104 is positioned at a focusing position of imaging optics, the two-dimensional nature of an LED array may result in an asymmetric intensity distribution as a function of azimuthal angle within the cavity 118, leading to non-uniform curing around a circumference of the glass optical fiber 104.

In view of the above-noted deficiencies of imaging optics, the curing apparatus 110 includes the non-imaging reflector 114. The non-imaging reflector 114 includes an interior surface 116. The interior surface 116 reflects curing light emitted by the radiation source 112. For example, in embodiments, the interior surface 116 comprises a reflective coating adapted to reflect light throughout the spectral range of interest. In embodiments, the entirety of the non-imaging reflector 114 is constructed from a material that reflects the curing light without application of a reflective coating thereto. In embodiments, the non-imaging reflector 114 is constructed from an aluminum-based material that is surface polished with $Al_2O_3$. In embodiments, the interior surface 116 is coated with a filtering layer that filters specific wavelengths out of the curing light (e.g., a dichroic filter layer or the like).

Figure 2A:
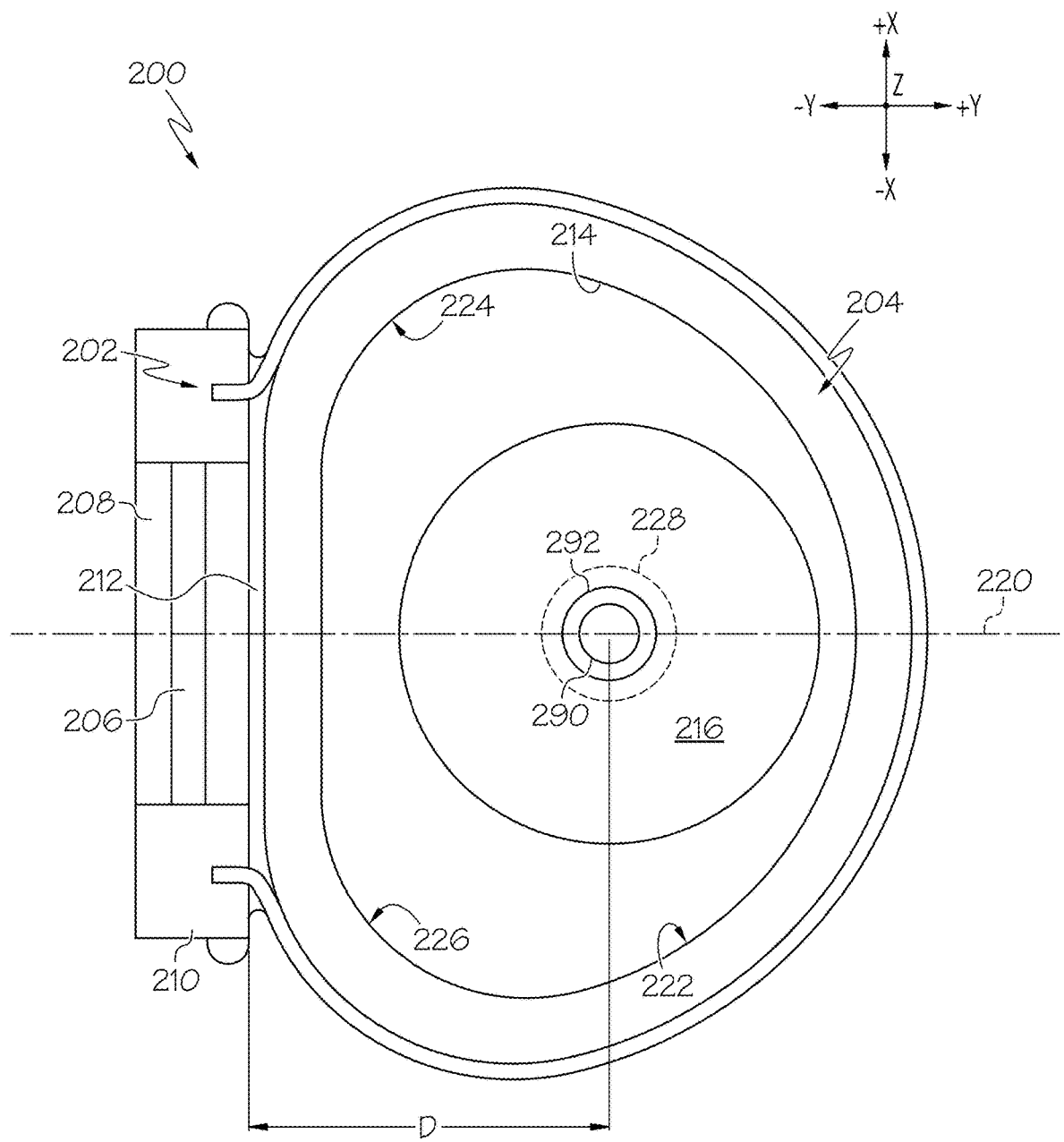
FIG. 2A depicts a view of a portion of a non-imaging reflector and a radiation source, according to one or more embodiments described herein.
Figure 2B:
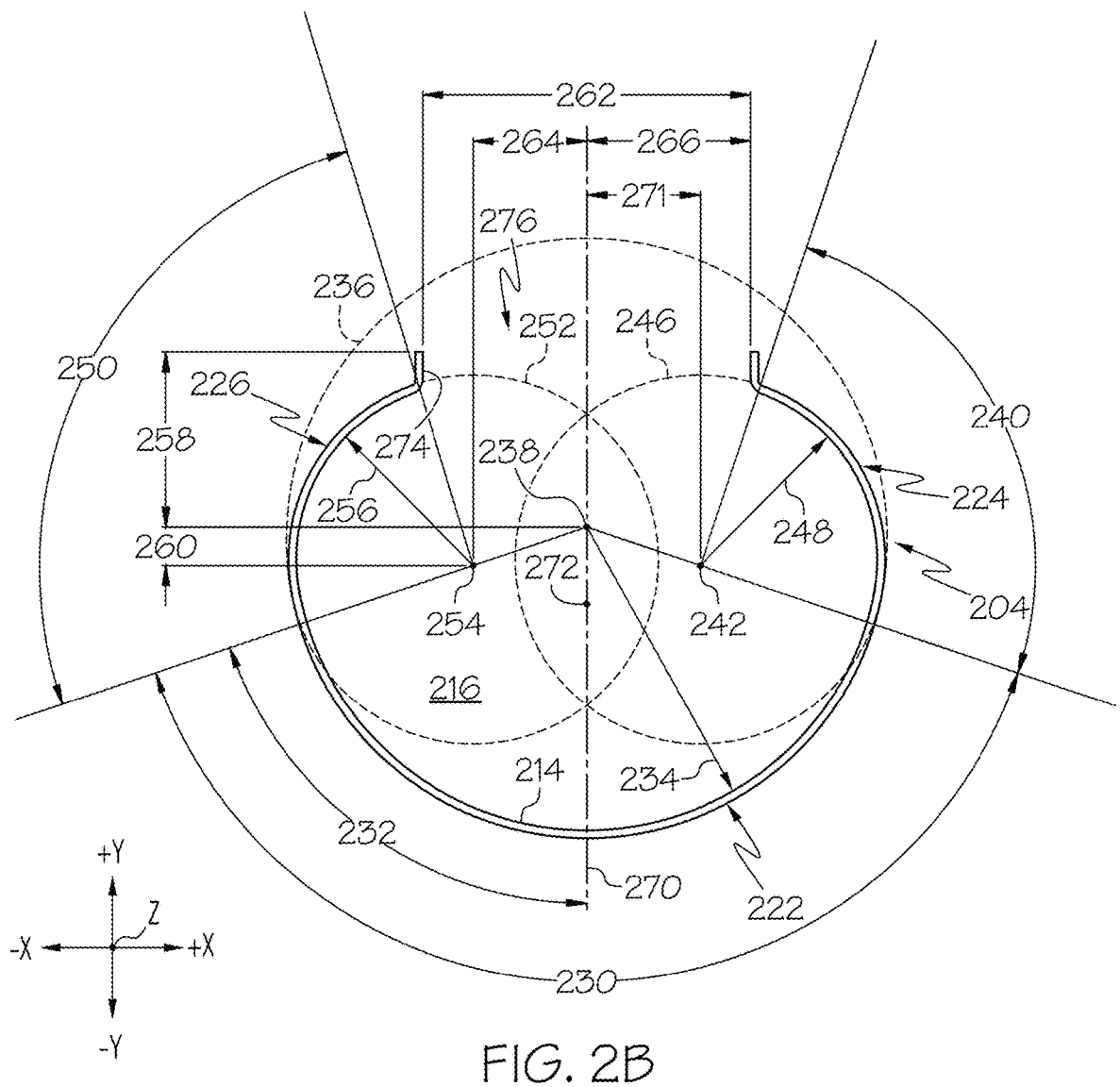
FIG. 2B schematically depicts aspects of a first portion, a second portion, and a third portion of the non-imaging reflector depicted in FIG. 2A.

The interior surface comprises a plurality of portions at different angular orientations facing the cavity 118, as described herein with respect to FIGS. 2A and 2B. In embodiments, the plurality of portions of the interior surface extend along different curved contours. At least some of the portions of the interior surface 116 have different degrees of curvature from one another. For example, in embodiments, a cross-section of the interior surface 116 (e.g., in the X-Y plane) comprises a first portion following a first curved contour, a second portion following a second curved contour, and a third portion following a third curved contour. The first curved contour may have a lesser degree of curvature (e.g., have a greater radius of curvature) than the second and third curved contours, constitute the largest angular section of the interior surface 116, and be aligned (e.g., in the Y-direction) with a central axis 124 of the radiation source 112. That is, curing light originating at the central axis 124 of the radiation source 112 may be incident on the first curved contour if such light is not re-directed. In embodiments, the non-imaging reflector 114 comprises a consistent cross-section throughout an entirety of the length of the non-imaging reflector such that each of the first, second, and third portions extend through an entirety of the length of the non-imaging reflector 114. In embodiments, at least one of the first, second, and third portions does not extend through an entirety of the length of the non-imaging reflector 114. The curing light from the radiation source 112 may reflect from each of the first, second, and third portions so as to be concentrated in a region in which the glass optical fiber 104 is disposed. Specifics regarding the form of the first, second, and third portions are provided in greater detail herein with respect to FIGS. 2A and 2B.

Referring now to FIG. 2A, a top-down view of a portion of the curing apparatus 200 is depicted. In embodiments, the curing apparatus 200 may be used in place of the curing apparatus 110 described herein with respect to FIG. 1. A glass optical fiber 290 covered with a curable coating composition 292 is disposed within the curing apparatus 200. For example, the glass optical fiber 290 may have been produced using equipment similar to the furnace 102 and the coating apparatus 106 described herein with respect to FIG. 1. The curing apparatus 200 includes a radiation source 202 and a non-imaging reflector 204. The radiation source 202 is an LED array comprising a plurality of LEDs 206 disposed on a wafer. In embodiments, the plurality of LEDs 206 are each configured to emit curing light within a spectral band that is absorbed by the curable coating composition 292 to initiate a curing reaction therein. For example, in embodiments, the plurality of LEDs 206 emit UV curing light in a wavelength range of greater than or equal to 300 nm and less than or equal to 430 nm (e.g., greater than or equal to 360 nm and less than or equal to 430 nm). The radiation source 202 further includes an emitter window 208 that transmits the curing light from the plurality of LEDs 206 into a cavity 216 defined by an interior surface 214 of the non-imaging reflector 204.

In embodiments, the emitter window 208 of the radiation source 202 has a first dimension (e.g., length) in the first direction of greater than or equal to 100 mm (e.g., 150 mm, 225 mm, 300 mm, 350 mm) and a second dimension (e.g., width) in a second direction perpendicular to the draw direction (e.g., the X-direction) that is smaller than the first dimension (e.g., 20 mm). The non-imaging reflector 204 may comprise a length that is greater than or equal to 100 cm and less than or equal to 200 cm in the Z-direction.

Referring still to FIG. 2A, the radiation source 202 includes a frame 210 through which the radiation source 202 is attached to the non-imaging reflector 204 at an attachment surface 212 of the non-imaging reflector. In the depicted embodiment, the emitter window 208 is flush against the attachment surface 212 such that the emitter window 208 is separated from a center of the glass optical fiber 290 by a distance D in a third direction that is perpendicular to both the first and second directions (e.g., the Y-direction). In embodiments, the distance D is less than or equal to 76.2 mm (3 inches). In embodiments, the distance D is greater than or equal to 25.4 mm (1.0 inches) and less than or equal to 40.64 mm (1.6 inches). In embodiments, the distance D is greater than or equal to 30.48 mm (1.2 inches) and less than or equal to 38.63 mm (1.45 inches) (e.g., 35.56 mm (1.40 inches)). The distance D may be selected based on the geometry of the interior surface 214 and characteristics of the curing light emitted by the radiation source 202. In embodiments, the radiation source 202 is held in spaced relation to the non-imaging reflector 204 such that the emitter window 208 does not contact the non-imaging reflector 204. It is also noted that in other embodiments, the radiation source 202 may be disposed within the cavity 216 of the non-imaging reflector 204.

The radiation source 202 includes an illumination axis 220 extending into the cavity 216. In the embodiment shown, the illumination axis 220 extends perpendicular to the glass optical fiber 290. In embodiments, the illumination axis 220 corresponds to a central axis of the emitter window 208 (e.g., the illumination axis 220 may be centered with respect to the distribution of radiation emitted by the radiation source 202). As depicted in FIG. 2A, the illumination axis 220 extends through a center of the glass optical fiber 290. That is, the glass optical fiber 290 is positioned within the cavity 216 such that the illumination axis 220 extends through the glass optical fiber 290. It should be understood that alternative configurations for the radiation source 202 are contemplated and within the scope of the present disclosure. For example, in embodiments, the radiation source 202 may be tilted with respect to the non-imaging reflector 204 such that the illumination axis 220 extends at an angle to the Y-direction. Moreover, in embodiments, the glass optical fiber 290 is not positioned on the illumination axis 220. In embodiments, the radiation source 202 is non-planar and may include a plurality of illumination axes for LEDs extending in different directions.

The radiation source 202 emits curing light through the emitter window 208 into the cavity 216. In embodiments, the curing light spreads from the illumination axis 220 as a function of distance from the emitter window 208 such that only a small portion of the curing light is incident on the curable coating composition 292 without reflecting off of the non-imaging reflector 204. In embodiments, the non-imaging reflector 204 does not comprise a single point of focus or create an image of the radiation source 202. Instead, the non-imaging reflector 204 is designed based on the distribution of the curing light emitted by the radiation source 202 and concentrates the curing light within a region (e.g., a curing zone 228) of the cavity 216 containing the glass optical fiber 290.

The interior surface 214 of the non-imaging reflector 204 includes a first portion 222, a second portion 224, and a third portion 226. The first portion 222, the second portion 224, and the third portion 226 each extend around a different angular segment of the interior surface 214. In embodiments, the interior surface 214 transitions directly from the first portion 222 to the second portion 224 and the third portion 226 at ends of the first portion 222. In embodiments, at least two of the first portion 222, the second portion 224, and the third portion 226 comprise different degrees of curvature. For example, in embodiments the first portion 222 comprises a lesser degree of curvature than the second portion 224 and the third portion 226. In embodiments, the second portion 224 and the third portion 226 comprise the same degree of curvature. In the embodiment depicted in FIG. 2A, the first portion 222 extends around a larger angular segment of the interior surface 214 than the second portion 224 and the third portion 226. The first portion 222 overlaps with the illumination axis 220 of the radiation source 202. The degrees of curvature of each of the first portion 222, the second portion 224, and the third portion 226 are designed based on a direction of light rays of the curing light emitted by the radiation source 202 such that the light rays are redirected to a curing zone 228 overlapping the positioning of the glass optical fiber 290. In embodiments, the glass optical fiber 290 is completely contained within the curing zone 228 such that the curable coating composition 292 receives a substantially uniform flux to facilitate uniform curing around a circumference of the glass optical fiber 290.

Referring now to FIG. 2B, the interior surface 214 of the non-imaging reflector 204 is schematically depicted in greater detail, according to an example embodiment. In the depicted embodiment, the first portion 222 of the interior surface 214 occupies a first arc length (e.g., angular segment) associated with a first central angle 230 of a first circle 236 with a first radius 234. That is, the first portion 222 follows a first curved contour on the first circle 236. The first circle 236 comprises a first center 238 positioned within the cavity 216. The first portion 222 extends around an arc length of the first circle 236 corresponding to the first central angle 230. The first portion 222 therefore possess a radius of curvature corresponding to the first radius 234. In embodiments, the first radius 234 is greater than or equal to 25.4 mm (1 inch) and less than or equal to 63.5 mm (2.5 inches) (e.g., greater than or equal to 25.4 mm (1 inch) and less than or equal to 40.64 mm (1.6 inches)). In embodiments, the central angle 230 is greater than or equal to 100 degrees. In embodiments, the central angle 230 is greater than or equal to 120 degrees and less than or equal to 150 degrees.

The non-imaging reflector 204 includes a central axis 270. In the depicted embodiment, the interior surface 214 is symmetrical about the central axis 270 and the first portion 222 of the interior surface 214 is centered with respect to the central axis 270. That is, the central axis 270 extends in the Y-direction and divides the first circle 236 into two semicircles, with each half of the first portion 222 extending on either side of the central axis 270 in the X-direction. The central axis 270 splits the first portion 222 into halves that are mirror images of one another over the central axis 270. The central axis 270 is an axis of symmetry of the first portion 222. As such, the central angle 230 may include a first angular portion 232 on a first side of the central axis 270 that is the same size and shape as a second angular portion on a second side of the central axis 270. As such, the first angular portion 232 may correspond to one half of the central angle 230. Further, in such embodiments where the interior surface 214 is symmetrical about the central axis 270, the second portion 224 of the interior surface 214 has the same shape as the third portion 226 of the interior surface 214. In embodiments, the non-imaging reflector 204 is not symmetrical about the central axis 270 (that is, a first portion of the non-imaging reflector 204 on a first side of the central axis 270 is not a mirror image of a second portion of the non-imaging reflector 204 on a second side of the central axis 270). Such non-symmetrical embodiments may beneficially concentrate curing light from radiation sources having non-symmetrical energy distributions on either side of the central axis 270 (e.g., where a radiation source is angled relative to the central axis 270).

In the depicted embodiment, the second portion 224 of the interior surface 214 occupies a second arc length (e.g., angular segment) associated with a second central angle 240 of a second circle 246 with a second radius 248. That is, the second portion 224 follows a second curved contour on the second circle 246. The second circle 246 has a second center 242 positioned within the cavity 216. The second portion 224 extends around an arc length of the second circle 246 corresponding to the second central angle 240. The second portion 224 therefore comprises a radius of curvature corresponding to the second radius 248. In embodiments, the second radius 248 is greater than or equal to 12.7 mm (0.5 inches) and less than or equal to 38.1 mm (1.5 inches) (e.g., greater than or equal to 12.7 mm (0.5 inches) and less than or equal to 22.86 mm (0.9 inches)). In embodiments, the central angle 240 is greater than or equal to 50 degrees. In embodiments, the central angle 240 is greater than or equal to 58 degrees and less than or equal to 118 degrees. In embodiments, the central angle 240 is greater than or equal to 60 degrees and less than or equal to 100 degrees (e.g. 88 degrees).

In embodiments, the third portion 226 of the interior surface 214 may have a similar geometry to the second portion 224 to maintain symmetry about the central axis 270. As such, the third portion 226 of the interior surface 214 occupies a third arc length (e.g., angular segment) associated with a third central angle 250 of a third circle 252 with a third radius 256 that equals the second radius 248 of the second circle 246. That is, the third portion 226 follows a third curved contour on the third circle 252. The third circle 252 comprises a third center 254 positioned within the cavity 216. The third portion 226 extends around an arc length of the third circle 252 corresponding to the third central angle 250. The third portion 226 therefore comprises a radius of curvature corresponding to the third radius 256. In embodiments, the third radius 256 is greater than or equal to 12.7 mm (0.5 inches) and less than or equal to 38.1 mm (1.5 inches) (e.g., greater than or equal to 12.7 mm (0.5 inches) and less than or equal to 22.86 mm (0.9 inches)). In embodiments, the central angle 250 is greater than or equal to 50 degrees. In embodiments, the central angle 250 is greater than or equal to 58 degrees and less than or equal to 118 degrees. In embodiments, the central angle 250 is greater than or equal to 60 degrees and less than or equal to 100 degrees (e.g., 88 degrees).

The first circle 236 comprises a first center 238, the second circle 246 comprises a second center 242, and the third circle 252 comprises a third center 254 (e.g., positioned at first, second, and third center locations, respectively). Given that each of the first, second, and third portions 222, 224, and 226 extend along circular contours (i.e., the first, second, and third curved contours, respectfully), the first, second, and third portions 222, 224, and 226 may focus light perpendicularly incident thereon towards the first, second, and third centers 238, 242, and 254. However, pursuant to the non-imaging optical design of the interior surface 214, none of the first, second, and third centers 238, 242, and 254 coincide with one another. That is, each of the first, second, and third centers 238, 242, and 254 are displaced from one another within the cavity 216. In the depicted embodiment, both the second center 252 and the third center 254 are offset from the first center 238 in a direction perpendicular to the central axis 270 (e.g., the Y-direction) by a distance 271. Additionally, the glass optical fiber 290 (see FIG. 2A) is positioned at a fiber location 272 that is also displaced from each of the first, second, and third centers 238, 242, and 254.

The fiber location 272 (e.g., where the center of the glass optical fiber 290 is positioned within the non-imaging reflector 204) is disposed on the central axis 270. The first center 238 of the first circle 236 is also disposed on the central axis 270 but axially displaced from the fiber location 272 on the central axis 270 (e.g., in the Y-direction). The second center 248 and the third center 254 are each displaced from the central axis 270 by a distance 264 in a direction perpendicular to the central axis 270 (e.g., in the X-direction). Further, the second center 248 and the third center 254 are aligned in the direction perpendicular to the central axis 270 and are displaced from the first center 238 by a distance 260 in a direction parallel to the central axis 270.

In embodiments, the fiber location 272 is based on a measured intensity distribution of curing light within the cavity 216. In embodiments, the fiber location 272 corresponds to a maximum measured intensity of curing light using a detector facing the radiation source 202 (see FIG. 2A). In embodiments, the fiber location 272 corresponds to a maximum measured intensity of curing light using a detector facing away from the radiation source 202 (e.g., facing towards the first portion 222). In embodiments, the fiber location 272 corresponds to a position within the cavity 216 where the azimuthal variation in measured intensity of curing light is less than a threshold. The azimuthal variation of the measured intensity of the curing light may indicate differences between measured intensities or powers using different azimuthal orientations of a detector within the cavity 216. Each azimuthal orientation of the detector may indicate an angle of rotation of an axis of the detector in the X-Y plane relative to the X-axis. For example, in embodiments, the azimuthal variation in measured of curing light as a function of measurement direction is less than or equal to 40% (e.g. less than or equal to 35.5%).

Referring still to FIG. 2B, the interior surface 214 is depicted to include extensions 274 extending in a direction parallel to the central axis 270. The extensions 274 delineate boundaries of an opening 276 in the non-imaging reflector 204. The opening 276 comprises a width 262 in a direction perpendicular to the central axis 270. The extensions 274 are a distance 266 from the central axis 270. In embodiments, the distance 266 is half of the width 262 of the opening 276. The first center 238 is positioned a distance 258 from the ends of the extensions 274. In embodiments, the distance 258 is determined based on the length of the extensions 274, which may set the distance between the radiation source 202 (see FIG. 2A) and the first center 238. Such a distance may be set to maximize flux at the fiber location 272.

In embodiments, the opening 276 is sized based on the size of the radiation source 202 (see FIG. 2A). For example, the opening 276 may be sized based on a size of an emitter window (e.g., the emitter window 208 described herein with respect to FIG. 2A) of the radiation source 202. In embodiments, the extensions 274 may be inserted in the frame 210 of the radiation source 202 such that the emitter window 208 is disposed in the opening 276 between the extensions 274. Such a structure is beneficial in that the cavity 216 is sealed by the emitter window 208 to prevent reflected curing light from exiting the cavity 216. Some embodiments may not include the extensions 274 (e.g. the radiation source 202 may be spaced from the non-imaging reflector 204, or flush against ends of the second and third portions 224 and 226). In embodiments, the radiation source 202 is coaxial with the non-imaging reflector 204 such that the illumination axis 220 (see FIG. 2A) is coextensive with (e.g., overlaps) the central axis 270. In such embodiments, the radiation source 202 is centered relative to the non-imaging reflector 204 such that substantially equal portions of curing light emitted by the radiation source 202 are redirected by the second portion 224 and the third portion 226.

It should be understood that alternative structures for the interior surface 214 are contemplated and within the scope of the present disclosure. For example, the angular extent of each portion of the interior surface 214 (e.g., the first, second, and third central angles 230, 240, and 250) may depend on a distance between the radiation source 202 and the non-imaging reflector 204 (e.g. the distance D described with respect to FIG. 2A). Additionally, aspects of each portion of the interior surface 214 (e.g., the first, second, and third, central angles 230, 240, 250, the values of the first, second, and third, radii 234, 248, and 256, the positioning of the first, second, and third centers 238, 242, and 254) may vary based on the distribution of curing light emitted from the radiation source 202. Moreover, the non-imaging reflector 204 is not limited to three portions, but may include two or more than three portions in embodiments.

In embodiments, at least one of the first, second, and third portions 222, 224, and 226 does not follow a circular contour. For example, at least one of the first, second, and third portions 222, 224, and 226 may follow an elliptical contour, and the positioning of the first, second, and third centers 238, 242, and 254 described herein may correspond to positioning of a focus of the elliptical contour. In another example, at least one of the first, second, and third portions 222, 224, and 226 may follow a curved contour that follows a conical, parabolic, or other non-circular shape. Any non-imaging reflector including multiple portions having varying degrees of curvature may be used consistent with the present disclosure.

Embodiments where the non-imaging reflector 204 is not symmetrical relative to the central axis 270 are also envisioned. In such embodiments, the angular extent of the second portion 224 may differ from the angular extent of the third portion 226, and the first portion 222 may not be centered relative to the central axis 270. Additionally, the first, second, and third centers 238, 242, and 254 may be positioned differently (e.g., the second center 242 and the third center 254 may not be aligned in the X-direction and disposed differing distance from the central axis 270 in such embodiments). Embodiments are also envisioned where the second portion 224 does not possess the same degree of curvature as the third portion 226. That is, the example described with respect to FIGS. 2A and 2B is exemplary only and not intended to be limiting An example curing apparatus was constructed using the structure described herein with respect to FIGS. 2A-2B. A commercially available LED array was used as the radiation source 202 and positioned such that the emitter window 208 thereof was a distance D of about 27.94 mm (1.1 inches) from the fiber location 272. In the example, the first portion 222 extended along a curved contour along the first circle 236 corresponding to a central angle 230 of 143 degrees. The first circle 236 comprised a radius of 28.96 mm (1.14 inches). The second and third portions 224 and 226 extended along curved contours along the second and third circles 246 and 252 corresponding to central angles 240 and 250 of about 88 degrees. The second and third circles 246 and 252 comprised a radius of curvature of 17.78 mm (0.70 inches). The opening 276 comprised a width 262 of 31.5 mm (1.24 inches). The distance 264 was 10.41 mm (0.41 inches), the distance 258 was 16.51 mm (0.65 inches), and the distance 260 was 3.56 mm (0.14 inches).

Figure 3A:
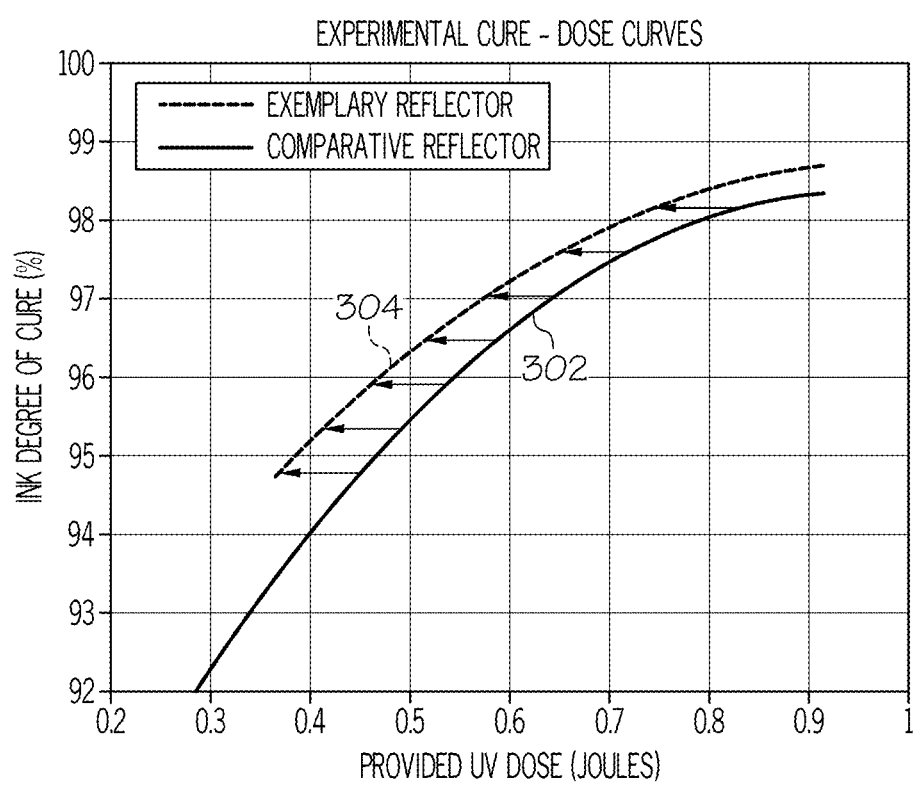
FIG. 3A depicts a chart comparing degree of cure of a coating composition as a function of illumination dosage for a non-imaging reflector and a comparative reflector, according to one or more embodiments described herein.

Measurements were taken comparing the performance of the non-imaging reflector 204 to a comparative reflector. FIG. 3A depicts two curves measuring experimental degrees of cure for an acrylate glass optical fiber coating as a function of supplied power to the radiation source. The curve 302 depicts results for the comparative reflector, while the curve 304 depicts the results for the non-imaging reflector 204. The curve 304 is shifted upward from the curve 302, reflecting an increase of greater than 0.10% in cure degree as a function of UV dose (e.g., the non-imaging reflector 204 increased cure degree by approximately 0.15% as a function of UV dose as compared to the comparative reflector). Such a result represents that the non-imaging reflectors described herein may facilitate process efficiency improvements over existing reflectors.

Figure 3B:
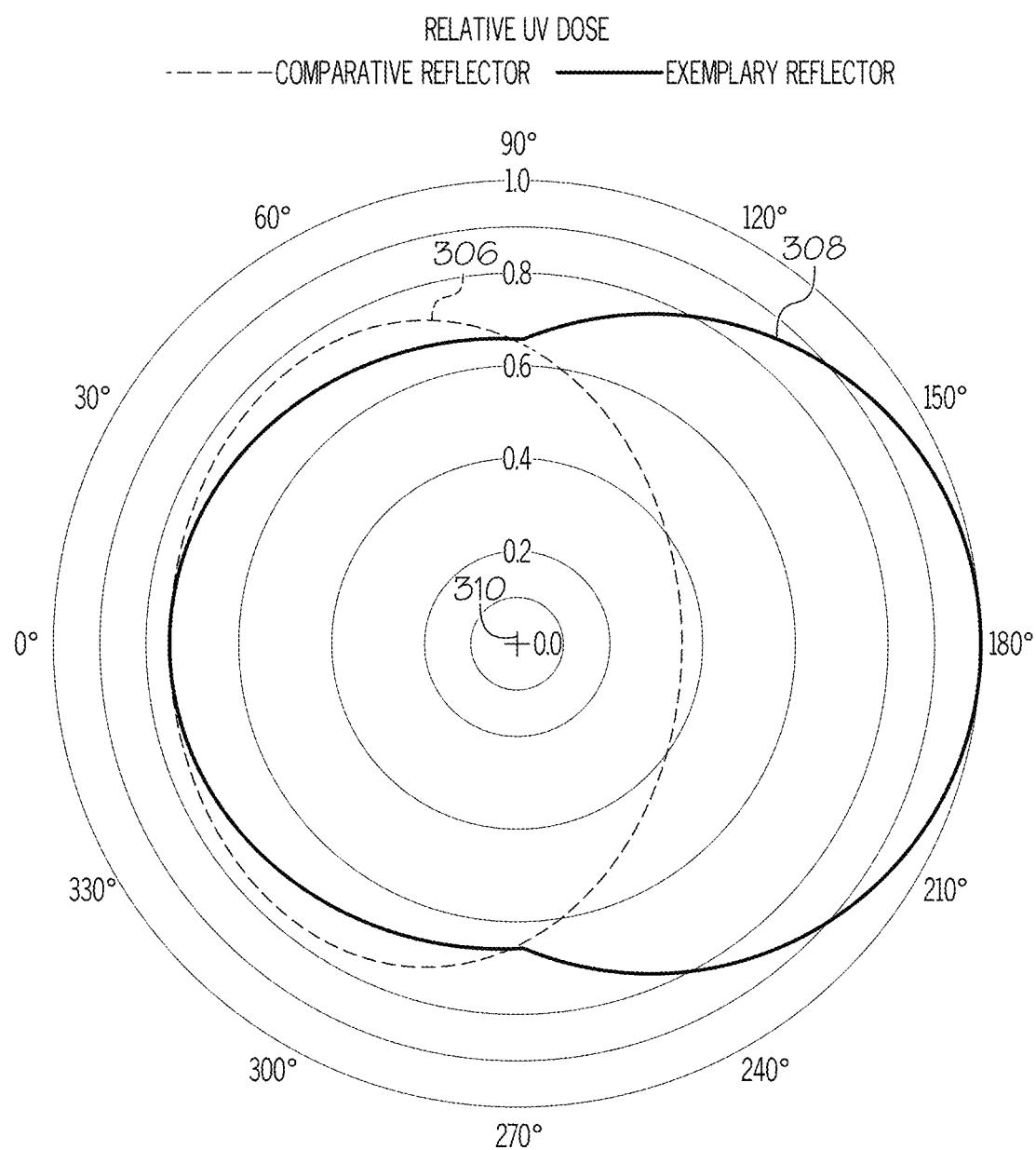
FIG. 3B depicts a chart comparing azimuthal energy distributions of a non-imaging reflector and a comparative reflector, according to one or more embodiments described herein.

Referring now to FIG. 3B, the azimuthal energy distribution for the non-imaging reflector 204 in accordance with this example was measured and compared to that of an elliptical comparative reflector. Referring to FIG. 2B, a photodetector was placed at the fiber location 272. The photodetector had a limited field of view such that curing light within a limited angular window could enter the photodetector per measurement. The photodetector integrated the amount of curing light incident thereon during a measurement period to measure a power of curing light incident thereon. The photodetector was rotated about a central axis (e.g., extending along the Z-direction in FIG. 2B) by a fixed angular amount to generate a plurality of angular measurements. That is, the power of curing light received by the photodetector was measured as a function of angle of rotation, with measurements being taken for angles of rotation from 0 degrees to 360 degrees. A similar procedure was followed to measure the azimuthal energy distribution of the comparative reflector (e.g., with the photodetector being positioned at a focal point of the comparative reflector) and the same LED source.

FIG. 3B depicts a first azimuthal energy distribution 306 depicting the angular measurements of the comparative reflector and a second azimuthal energy distribution 308 of the non-imaging reflector 204 according to the present example. The first and second azimuthal energy distributions 306 and 308 depict normalized power measurements as a function of angular position. The magnitude of the normalized power measurements are depicted as a distance from a center 310 of the chart. The second azimuthal energy distribution 308 reflects a consistently higher measured power for the non-imaging reflector 204 as compared to first azimuthal energy distribution 306 of the comparative reflector. The normalized power measurements of the first azimuthal energy distribution 306 are consistently less than 0.5 for azimuthal angles greater than or equal to 90 degrees and less than or equal to 270 degrees (e.g., representing the area of a glass optical fiber not facing the radiation source). Over a similar angular range, the second azimuthal energy distribution are consistently greater than 0.8. Additionally, for azimuthal angles less than or equal to 90 degrees and greater than or equal to 270 degrees (e.g., representing the area of a glass optical fiber facing the radiation source), the non-imaging reflector 204 provides similar power as the comparative reflector. As such, the non-imaging reflector 204 substantially improves curing performance over an angular range greater than or equal to 90 degrees and less than or equal to 270 degrees, while not decreasing performance at other azimuthal angles, resulting in greater curing uniformity.

It is worth noting that the second azimuthal energy distribution 308 includes consistently higher power measurements than the first azimuthal energy distribution 306 at the same angle of measurement. As a result, a curable coating composition within the non-imaging reflector 204 is exposed to more curing light flux than when positioned within the comparative reflector. Additionally, the first azimuthal energy distribution 306 contains a maximum measured power (e.g., at approximately 30 degrees) that is only about 65% of a maximum measured power (e.g., at approximately 180 degrees) of the second azimuthal energy distribution 308. The second azimuthal energy distribution 308 also beneficially has a smaller degree of variance than the first azimuthal energy distribution 306. The normalized power measurements of the first azimuthal energy distribution 306 vary from one another by up to 50%, while the normalized power measurements of the second azimuthal energy distribution 308 differ from on another by up to 35%. Thus, the non-imaging optical reflector 204 provides consistently greater and more uniform curing light flux than the comparative reflector.

Figure 4:
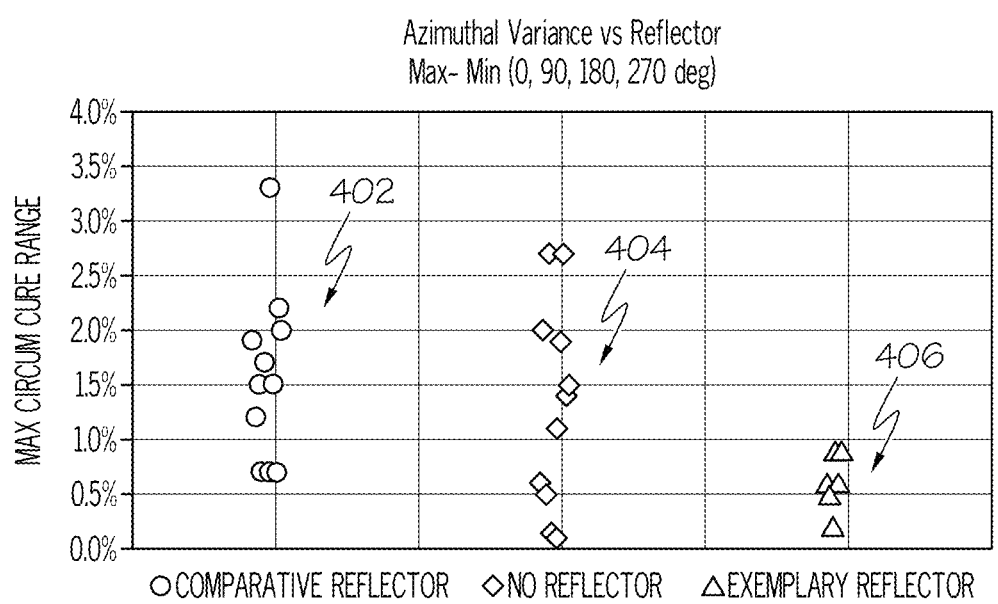
FIG. 4 depicts a chart depicting azimuthal cure variances of a coating composition on a glass optical fiber using a non-imaging reflector, a comparative reflector, and no reflector, according to one or more embodiments described herein.

The benefits of such an azimuthal energy density distribution are demonstrated in FIG. 4, which is a chart depicting a plurality of measurements of curing variation of an acrylate fiber coating as a function of azimuthal angle. Each measurement depicts a maximum of a plurality of angular measurements of degree of cure (e.g., at azimuthal positions of 0 degrees, 90 degrees, and 180 degrees, and 270 degrees, respectively) minus the minimum of the plurality of the angular measurements. FIG. 4 includes a first distribution 402 representing a distribution of curing variation measurements associated with a comparative reflector. A second distribution 404 represents a distribution of curing variation measurements associated with use of no optical reflector. A third distribution 406 represents a distribution of curing variation measurements associated with the non-imaging reflector 204 described herein. As depicted in the first and second distributions 402 and 404, the comparative reflector provides a similar range of curing variation as with no reflector. That is, the comparative reflector does not significantly improve curing uniformity as a function of azimuthal angle over not using a reflector. The first distribution 402 depicts a degree of cure variation that may approach above 3.0%. The third distribution 406, in contrast, provides a degree of cure variation that approaches at most 1.0%. Such a tighter distribution of curing variance is a result of the uniform azimuthal energy distribution of curing light of the non-imaging reflector 204 described herein with respect to FIG. 3B.

Figure 5:
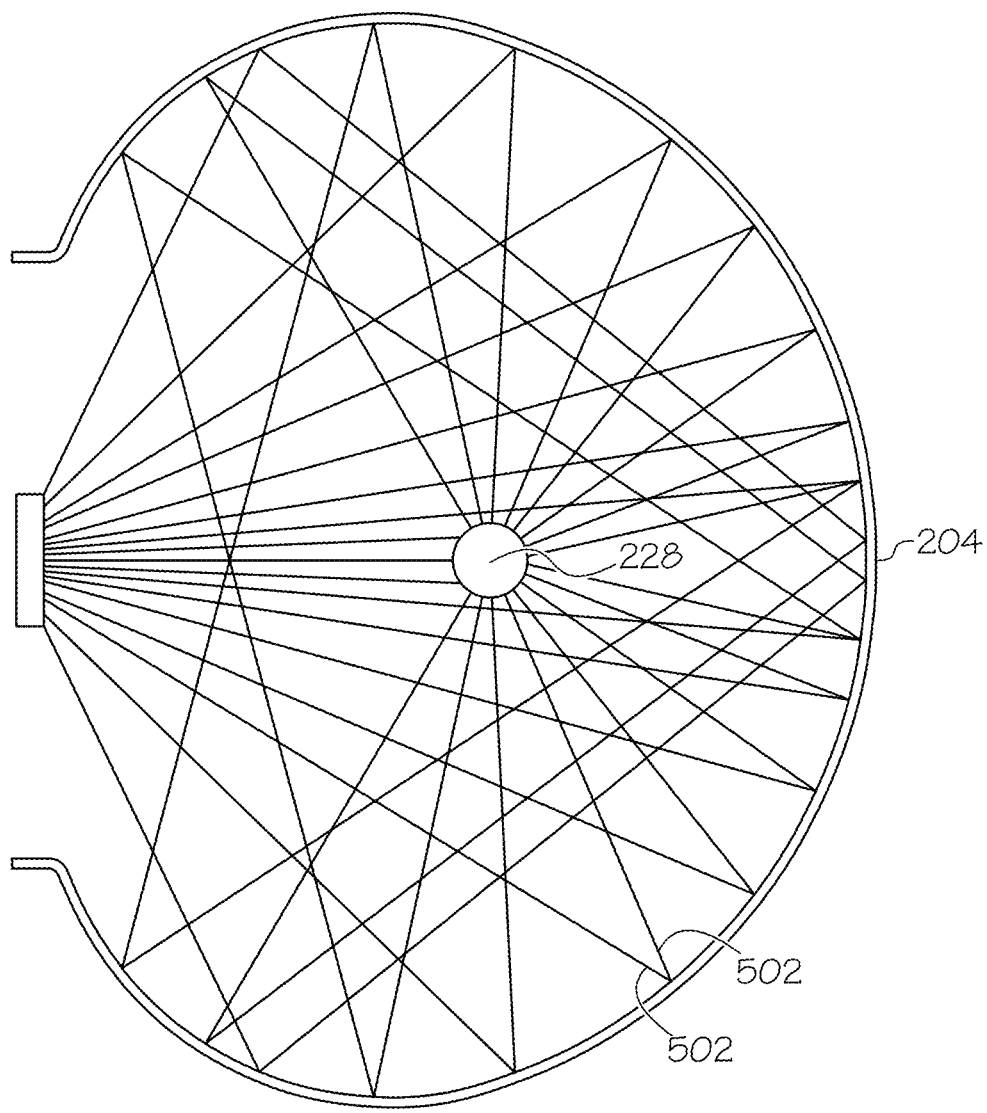
FIG. 5 depicts a cross-section of a non-imaging reflector showing the rays of curing light reflected by the non-imaging reflector, according to one or more embodiments described herein.

FIG. 5 depicts the lights rays 502 emitted by the radiation source 202 and reflected within the non-imaging reflector 204. As shown in FIG. 5, the light rays 502 are reflected to the curing zone 228 such that the maximum intensity of curing light is within the curing zone 228. The position of the curing zone 228 overlaps with the position of the glass optical fiber 290, as discussed above. Therefore, the glass optical fiber 290 receives a substantially uniform concentration of the light rays 502, thus providing substantially uniform curing of the coating on the glass optical fiber 290.

In some embodiments, the maximum intensity of the curing light is less than 3.0 mm from a center of the glass optical fiber 290. In other embodiments, the maximum intensity of the curing light is about 2.5 mm or less, or about 2.0 mm or less, or about 1.5 mm or less, or about 1.0 mm or less, or about 0.5 mm or less, or about 0.0 mm from the center of the glass optical fiber 290.

Table 1 below shows the intensity of the curing light (emitted by the radiation source 202) relative to the center of the glass optical fiber 290 of the exemplary non-imaging reflector 204 shown in FIG. 2B. As shown in Table 1, in this example, the center of the glass optical fiber 290 at the (0.0 mm, 0.0 mm) position is also at the same position as the maximum intensity of the curing light (at the 100% curing light intensity mark). It is further noted that moving upward or downward in the y-direction or moving in the x-direction away from the center of the glass optical fiber 290, at the (0.0 mm, 0.0 mm) position, causes the intensity of the curing light to decrease. For example, the intensity of the curing light is only 85% of the maximum intensity at the (0.0 mm, −2.5 mm) position. Moving further outward in the x- and y-directions causes the intensity of the curing light to decrease to 76% of the maximum intensity of the curing light at the (4 mm, −5.0 mm) position. The relative displacement values of Table 1 are derived with the radiation source 202 being disposed to the left of the glass optical fiber 290.

TABLE 1

| Percent of Maximum Intensity of the Curing Light Relative to Fiber Location | | | | | | |
|---|---|---|---|---|---|---|
| Distance from Center of the Glass Optical Fiber in | Distance from Center of the Glass Optical Fiber in X-Direction | | | | | |
| Y-Direction | 0.0 mm | 1.0 mm | 2.0 mm | 3.0 mm | 4.0 mm | 5.0 mm |
| 5.0 mm | 79% | 77% | 76% | 79% | 82% | 81% |
| 2.5 mm | 98% | 92% | 88% | 86% | 83% | 77% |
| 0.00 mm | 100% | 99% | 98% | 86% | 81% | 78% |
| −2.5 mm | 85% | 85% | 88% | 88% | 85% | 76% |
| −5.0 mm | 78% | 75% | 75% | 76% | 76% | 77% |

In the example of Table 1, the first portion 222, the second portion 224, and the third portion 226 are each configured to reflect the curing light (emitted by the radiation source 202) so that the curing light is 'concentrated' to the curing zone 228. By 'concentrated' it is meant that the intensity of the light is 60% or greater relative to the maximum intensity. Therefore, all the reflected curing light within the curing zone 228 is about 60% or greater relative to the maximum intensity of the curing light. In other embodiments, all the reflected curing light within the curing zone 228 is about 65% or greater, or about 70% or greater, or about 75% or greater, or about 80% or greater, or about 85% or greater, or about 90% or greater, or about 95% or greater, or about 100% relative to the maximum intensity of the curing light.

Figure 6A:
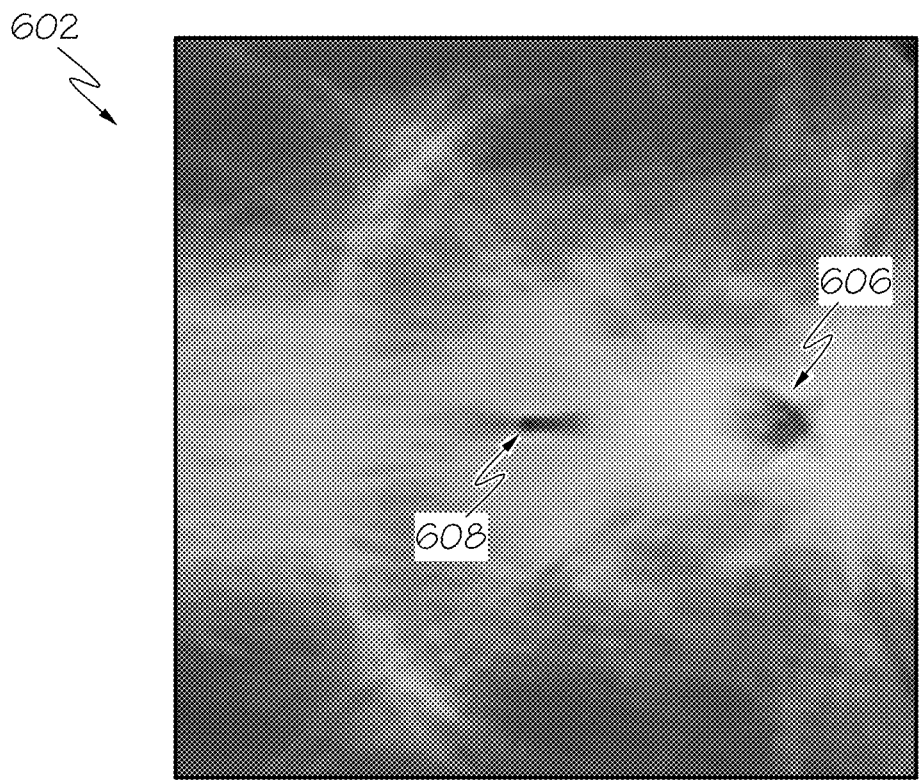
FIG. 6A depicts an intensity distribution of curing light reflected by a comparative reflector in relation to a glass optical fiber position, according to one or more embodiments described herein.
Figure 6B:
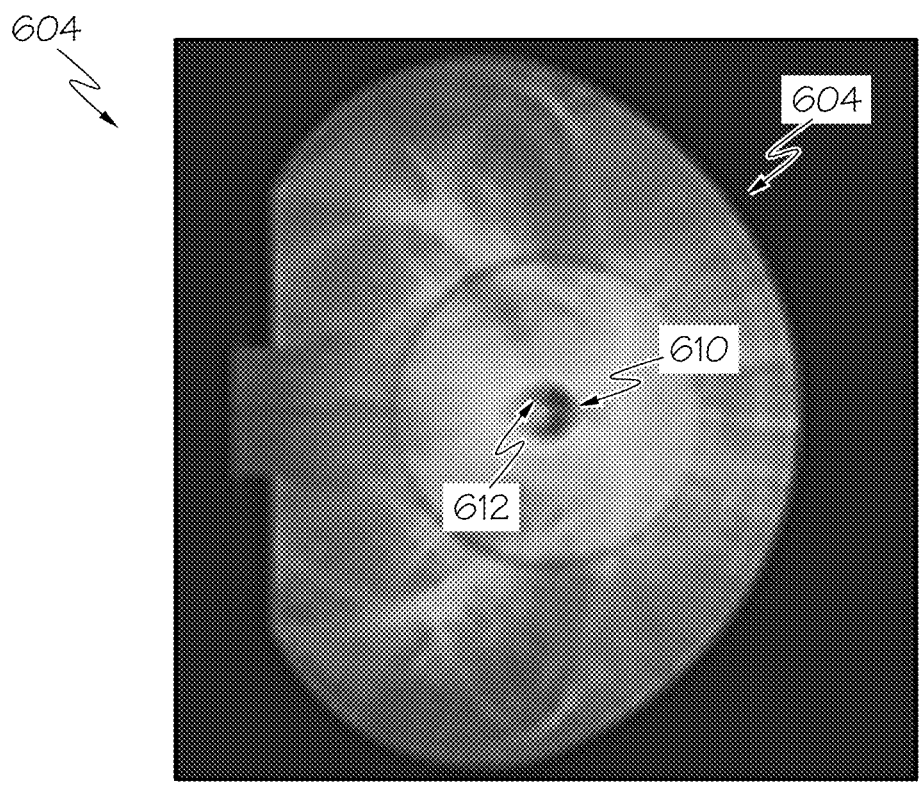
FIG. 6B depicts an intensity distribution of curing light reflected by a non-imaging reflector in relation to a glass optical fiber position, according to one or more embodiments described herein.

As shown in FIG. 5 and Table 1, the location of the maximum intensity of the curing light and the location of the glass optical fiber 290 are positioned in very close proximity to each other and within the curing zone 228. In some embodiments, the location of the maximum intensity of the curing light and the location of the glass optical fiber 290 overlap (either partially or completely). FIGS. 6A and 6B further demonstrate the relative displacement between the maximum intensity of the curing light and the location of the glass optical fiber 290 of the exemplary embodiment of FIG. 2B along with a comparative reflector.

In FIGS. 6A and 6B, the intensity distributions of the curing light were provided using an LED array light source. FIG. 6A depicts a first calculated intensity distribution 602 associated with an elliptical comparative reflector. As discussed above, FIG. 6B depicts a second calculated intensity distribution 604 associated with the non-imaging reflector 204 of FIG. 2B. The first calculated intensity distribution 602 includes a peak intensity zone 606 that is offset from a fiber position 608 of the comparative reflector. The second calculated intensity distribution 604, in contrast, includes a peak intensity zone 610 containing a fiber position 612. The disposal of the fiber position 612 within the peak intensity zone 610 beneficially results in a coating composition disposed therein receiving additional curing light flux from reflection off of the non-imaging reflector 204 over the comparative reflector. According to the first calculated intensity distribution 602, a curable coating composition disposed at the fiber position 608 absorbs a total flux of 2.66 mW of curing light from the LED array. A curable coating composition disposed at the fiber position 612, in contrast, absorbs a total flux of 4.24 mW, representing an improvement of greater than 50% over the comparative reflector. Such a greater amount of absorbed flux facilitates greater drawing speeds during the fiber production and coating process, and thus improved overall fiber production efficiency enhancements over existing processes.

In view of the foregoing, it should be understood that incorporating a non-imaging reflector into curing apparatuses for curing coating compositions on glass optical fibers may result in improved curing performance both in terms of overall absorbed flux by the coating composition and azimuthal distribution. Incorporating a plurality of portions into the non-imaging reflector having differing degrees of curvature that each reflect curing light from a radiation source beneficially concentrates the curing light to a curing zone containing the glass optical fiber. The curing zone contains a curing light flux having a variance of less than 35% as a function of azimuthal angle within the non-imaging reflector, providing uniform curing around an entirety of the circumferences of the glass optical fibers. The plurality of portions of the non-imaging reflectors may follow circular contours having centers that are offset from one another and the positioning of the glass optical fibers to provide greater curing light flux than that provided by existing reflectors, resulting in improved curing performance.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An apparatus for curing a coating composition disposed on a glass optical fiber, the apparatus comprising:
    a reflector having a longitudinal length and defining a cavity, the reflector comprising an interior surface delineating a boundary of the cavity, the interior surface comprising a plurality of portions, each of the portions extending along a different curved contour, wherein:
        each of the plurality of portions is configured to reflect curing light so that the reflected curing light is concentrated to a curing zone within the cavity such that all the reflected curing light within the curing zone has an intensity of about 60% or greater relative to a maximum intensity of the reflected curing light,
        a fiber location for the glass optical fiber is located within the curing zone,
        the plurality of portions comprises a first portion, a second portion, and a third portion the first portion having a different degree of curvature than the second portion, and the first portion having a different degree of curvature than the third portion,
        the interior surface transitions directly from the first portion into the second portion, and the interior surface transitions directly from the first portion into the third portion,
        the first portion extends along a first curved contour, the first curved contour forming a first circle, the first circle comprising a first radius and a first center disposed at a first center location within the cavity,
        the second portion extends along a second curved contour, the second curved contour forming a second circle, the second circle comprising a second radius and a second center disposed at a second center location within the cavity,
        the third portion extends along a third curved contour, the third curved contour forming a third circle, the third circle comprising a third radius and a third center disposed at a third center location within the cavity,
        the second center location is different than the first center location, the third center location is different than the first center location, and the second center location is different than the third center location,
        the second circle and the third circle are disposed within the first circle,
        the second circle partially overlaps with the third circle,
        the second curved contour comprises a greater degree of curvature than the first curved contour, and the third curved contour comprises a greater degree of curvature than the first curved contour, and
        the first portion extends around a larger angular segment of the interior surface than either of the second portion and the third portion.

2. The apparatus of claim 1, further comprising a radiation source configured to emit the curing light.

3. The apparatus of claim 2, wherein the radiation source is disposed outside of the cavity.

4. The apparatus of claim 2, wherein the radiation source is disposed within the cavity.

5. The apparatus of claim 2, wherein the radiation source comprises an array of light emitting diodes (LEDs).

6. The apparatus of claim 1, wherein the first portion is directly connected to the second portion.

7. The apparatus of claim 1, wherein the first center location is axially offset from the second center location in a direction perpendicular to the longitudinal length of the reflector.

8. The apparatus of claim 1, wherein the first radius is greater than the second radius.

9. The apparatus of claim 1, wherein the reflector is symmetrical about a center axis of the reflector.

10. The apparatus of claim 1, wherein the first portion is symmetrical about a center axis of the reflector.

11. The apparatus of claim 1, wherein:
    the first portion is disposed between the second portion and the third portion.

12. The apparatus of claim 11, wherein the third center location is axially offset from the first center location and from the second center location in a direction perpendicular to the longitudinal length of the reflector.

13. The apparatus of claim 11, wherein the second radius equals the third radius.

14. The apparatus of claim 13, wherein the second and third radii are each less than the first radius.

15. The apparatus of claim 11, wherein the first portion of the interior surface comprises a first arc length corresponding to a central angle of the first circle, the first arc length being greater than or equal to 120 degrees and less than or equal to 150 degrees.

16. The apparatus of claim 15, wherein:
the second and third portions of the interior surface comprise second and third arc lengths corresponding to central angles of second and third circles, respectively,
the second arc length is greater than or equal to 60 degrees and less than or equal to 100 degrees, and
the third arc length is greater than or equal to 60 degrees and less than or equal to 100 degrees.

17. The apparatus of claim 1, wherein each of the plurality of portions is configured to reflect the curing light so that the reflected curing light is concentrated to the curing zone such that all the reflected curing light within the curing zone has an intensity of about 80% or greater relative to the maximum intensity of the reflected curing light.

18. The apparatus of claim 1, wherein the maximum intensity of the reflected curing light is 2.0 mm or less from a center of the glass optical fiber.

19. The apparatus of claim 18, wherein the maximum intensity of the reflected curing light is about 1.0 mm or less from the center of the glass optical fiber.

20. The apparatus of claim 1, further comprising the glass optical fiber disposed at the fiber location.

21. The apparatus of claim 20, wherein:
the glass optical fiber is disposed at a different location than the first center location and the second center location.

* * * * *